United States Patent
Michioka et al.

(10) Patent No.: US 7,040,189 B2
(45) Date of Patent: May 9, 2006

(54) CIRCULATION MEMBER OF BALL SCREW AND BALL SCREW USING SAME

(75) Inventors: Hidekazu Michioka, Tokyo-to (JP); Yasuyuki Abe, Tokyo-to (JP); Hiroshi Niwa, Tokyo-to (JP); Katsuya Iida, Tokyo-to (JP); Toshiaki Kadono, Tokyo-to (JP); Takeki Shirai, Tokyo-to (JP); Hironori Shoji, Tokyo-to (JP)

(73) Assignee: THK Co., Ltd., Tokyo (JP)

( * ) Notice: Subject to any disclaimer, the term of this patent is extended or adjusted under 35 U.S.C. 154(b) by 154 days.

(21) Appl. No.: 10/309,341

(22) Filed: Dec. 4, 2002

(65) Prior Publication Data
US 2003/0123951 A1    Jul. 3, 2003

(30) Foreign Application Priority Data
Dec. 5, 2001 (JP) ............................ P2001-372047
Nov. 7, 2002 (JP) ............................ P2002-324425

(51) Int. Cl.
*F16H 25/24* (2006.01)

(52) U.S. Cl. ................................ 74/424.82; 74/424.86

(58) Field of Classification Search ............ 74/424.82, 74/424.83, 424.84, 424.86, 424.87
See application file for complete search history.

(56) References Cited

U.S. PATENT DOCUMENTS

| | | | | |
|---|---|---|---|---|
| 3,143,896 A | * | 8/1964 | Edwards | ................... 74/424.86 |
| 3,145,580 A | * | 8/1964 | Widmoyer et al. | ...... 74/424.86 |
| 3,971,264 A | * | 7/1976 | Detraz et al. | ............ 74/424.87 |
| 4,750,378 A | * | 6/1988 | Sheppard | ................. 74/424.87 |
| 4,953,419 A | * | 9/1990 | Schlenker | ................ 74/424.86 |
| 5,063,809 A | * | 11/1991 | Schlenker | ................ 74/424.86 |
| 5,555,770 A | | 9/1996 | Dolata et al. | ................. 74/459 |

FOREIGN PATENT DOCUMENTS

| | | |
|---|---|---|
| EP | 0 418 999 | 3/1991 |
| JP | 10-213203 | * 8/1998 |

* cited by examiner

*Primary Examiner*—William C. Joyce
(74) *Attorney, Agent, or Firm*—Westerman, Hattori, Daniels & Adrian, LLP.

(57) ABSTRACT

A circulation member of a ball screw for circulating a ball rolling on a spiral ball rolling groove formed on a screw shaft. The circulation member includes a central portion and a pair of leg portions disposed at both ends of the central portion so as to extend therefrom, the leg portions having inner peripheries having center lines inclined in directions different from each other with respect to a center line of an inner periphery of said central portion. The leg portions also have outer peripheries having center lines being parallel to each other and have thicknesses, different in circumferential directions thereof, at cross sections in directions normal to center lines of the outer peripheries of the respective leg portions.

12 Claims, 9 Drawing Sheets

FIG. 6(A)
FIG. 6(B)
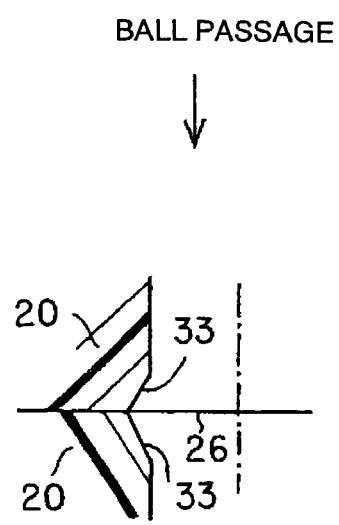
BALL PASSAGE
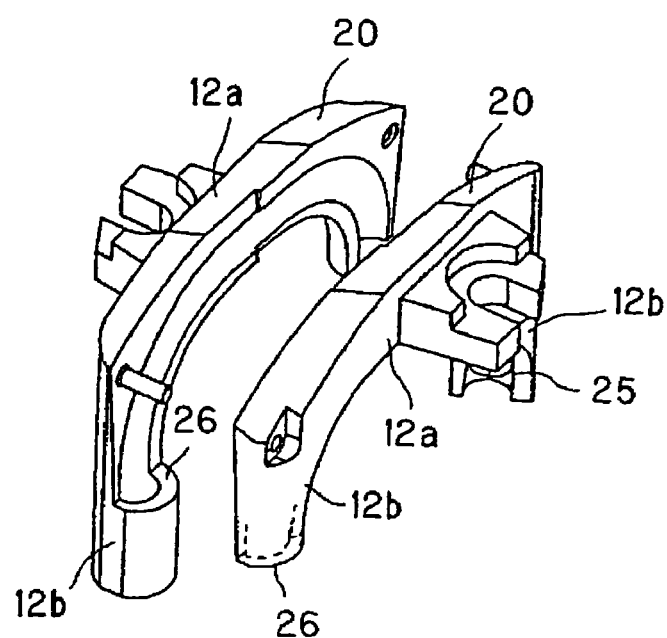

CIRCULATION MEMBER OF BALL SCREW AND BALL SCREW USING SAME

BACKGROUND OF THE INVENTION

1. Technical Field

The present invention relates to a circulation member or part for circulating balls of a ball screw and also relates to a ball screw using the circulation member.

2. Related Art

A ball screw generally comprises a screw shaft having an outer peripheral surface on which a ball rolling groove having a spiral or helical shape is formed, a nut member having an inner peripheral surface on which a ball rolling groove having a spiral or helical shape is formed, and a number of balls disposed between a loaded ball rolling passage formed by the ball rolling grooves of the screw shaft and nut member. In this structure, when the screw shaft is rotated relatively to the nut member, the balls roll in the loaded rolling passage formed by the screw shaft and the nut member.

FIG. 9 shows one example of a nut member, to which a return pipe 3 as a circulation member is mounted so as to connect one and the other end portions of a loaded rolling passage 2. The return pipe 3 has a portal shape having a leg portion of which end portions are provided with scooping portions for scooping the balls. The return pipe 3 acts to scoop, at its one end, the balls rolling on the loaded rolling passage 2, to guide them inside the return pipe 3 and then to return them to the loaded rolling passage from the other end thereof. According to such action, the balls rolling on the loaded rolling passage 2 circulate, in the endless manner, in the circulation passage composed of the loaded rolling passage 2 and the return pipe 3.

Recently, in order to ensure the smooth circulation of the balls, that is, to smoothly guide the balls rolling on the loaded rolling passage 2 into the return pipe 3 and smoothly return the balls moving in the return pipe 3 to the loaded rolling passage 2, there has been adopted a structure for scooping the balls to the loaded rolling passage 2 from a direction tangential thereto. In such structure, a pair of leg portions 3b, 3b disposed at both sides of the central portion of the return pipe 3 are tilted (inclined) by a predetermined angle each in different direction with respect to the central portion 3a so as to correspond to a lead angle of the screw shaft.

According to a known method of such return pipe 3, an iron tube is bent so as to provide a portal shape and a scooping portion is then machine-worked. In this known method, however, much manufacturing cost is involved and it is difficult to bend the tube with predetermined dimensional performance, providing a problem. Especially, when it is required to incline the leg portions 3b, 3b of the return pipe 3 in the directions different from each other in accordance with the lead angle of the screw shaft, it is necessary to bend the tube three-dimensionally, which results in further difficulty in working.

FIG. 10 shows another example of a conventional return pipe 4. With reference to FIG. 10, the return pipe 4 is divided into two parts 4a, 4a in a plane including an axial line of the pipe. These two parts 4a, 4a are produced by press-working a metal plate member by using a mold so as to provide a semi-circular cross section.

In such return pipe manufacturing method through the press-working, in a case where the leg portions 5, 5 of the return pipe 4 are bent in one plane, i. e., where the leg portions 5, 5 are not inclined in correspondence to the lead angle of the screw shaft, joining (or joined) surfaces 6, 6 of the respective divided parts 4a, 4a are positioned in the same one plane, so that the respective divided two parts 4a, 4a can be easily manufactured. However, on the other hand, in a case where the leg portions 5, 5 are inclined in different directions from each other in accordance with the lead angle of the screw shaft, the joining surfaces 6, 6 of the respective divided parts 4a, 4a are not positioned in the same one plane and provide such a shape as like as twisted. Therefore, it is extremely difficult to manufacture the return pipe 4 by the press-working of the metal plate member.

SUMMARY OF THE INVENTION

The object of the present invention is to provide a circulation member of a ball screw capable of being easily manufactured even if a pair of leg portions provided at both end portions of a central portion of the circulation member are inclined at predetermined angles from each other with respect to the central portion thereof so as to correspond to the lead angle of a screw shaft.

Another object of the present invention is to provide a screw shaft provided with the circulation member of the character mentioned above.

These and other objects can be achieved, according to the present invention, by providing, in one aspect, a circulation member of a ball screw for circulating a ball rolling on a spiral ball rolling groove formed on a screw shaft comprising:

a central portion; and a pair of leg portions disposed at both ends of the central portion so as to extend therefrom, wherein the leg portions have inner peripheries having center lines inclined in directions different from each other with respect to a center line of an inner periphery of the central portion and the circulation member is divided into two parts by first and second division surfaces, the first division surface lying on a plane including a center line of the inner periphery of one of the leg portions and the center line of the inner periphery of the central portion and the second division surface being different from the first division surface and lying on a plane including a center line of the inner periphery of the other one of the leg portions and the center line of the inner periphery of the central portion.

When the circulation member of the ball screw is molded by using a mold, a mold product is generally formed by using a pair of mold halves to be opened in opposing directions. Therefore, in a case where the joining surfaces of the divided parts of the circulation member have twisted surfaces, it is difficult to mold the divided parts. According to the present invention mentioned above, however, since the circulation member is divided by the first and second division surfaces, the joining surfaces of the divided parts are not twisted. Thus, the respective divided parts of the circulation member can be formed through the molding process. In addition, according to such molding process, the circulation member can be formed from resin as well as metal. The circulation member can be thus manufactured at high performance and low cost, being advantageous.

In the above aspect, it is preferred that the center lines of the inner peripheries of the paired leg portions are inclined with respect to the center line of the inner periphery of the central portion of the circulation member so as to correspond to a lead angle of the screw shaft.

It is also preferred that the leg portions are disposed so that the center lines of the inner peripheries thereof are each positioned in a tangential direction of the spiral ball rolling groove.

It is further preferred that the divided two parts have joining surfaces on which a staged portion having difference in level is formed by the first and second division surfaces.

According to these preferred embodiments, the circulation member can be easily manufactured. The staged portion may be utilized as positioning member.

It is further preferred that the divided parts are molded products of resin.

In the circulation member, the balls mainly slide but slightly roll. Because of this reason, when the ball is circulated at high speed, a large load is applied to a direction changing passage of the circulation member, resulting in generation of wearing or dust. According to this preferred embodiment, since the circulation member is formed as a mold product of resin, thus preventing dust or like from generating. In a further preferred embodiment, a free end portions of the paired leg portions are formed with scooping portions respectively which scope balls rolling on a periphery of the screw shaft by contacting the balls, the scooping portions are molded integrally with the divided parts respectively, and each of the scooping portions is not divided by either one of the first and second division surfaces.

Concerning this embodiment, the ball contacts with the scooping portion and then is scooped thereby from the loaded rolling passage into the circulation member, and for this purpose, it is required for the scooping portion to have a certain strength. In addition, when the ball is smoothly scooped, it is also required to have a high dimensional performance. In a case where such scooping portion is formed by divided portions, there may cause a force on the scooping portions to be opened by the contact of the balls, and in addition, there may cause a difference in level at the division (divided) surfaces. According to this embodiment, the scooping portions are formed integrally with the divided parts respectively, and not divided, so that the scooping portions can maintain the strength and high dimensional precision. These scooping portions can be also utilized for positioning at a time of assembling the divided parts.

It is further preferred that the circulation member is divided into two parts only by the first and second division surfaces.

According to this embodiment, the division surfaces having simple shapes can be provided, thus easily manufacturing the circulation member.

It is further preferred that each of the divided parts is formed integrally with a mount seat for mounting the circulation member to a nut member of a ball screw.

According to this embodiment, since the mount seat for mounting the circulation member to the nut member is integrally formed with each of the divided parts, the number of parts can be reduced, resulting in cost reduction and the rotation of the circulation member can be also prevented. In addition, the mounting angle of the circulation member with respect to the nut member becomes easily adjustable and the scooping portion can be suitable positioned.

The objects of the present invention can be also achieved by providing, in another aspect, a circulation member of a ball screw for circulating a ball rolling on a spiral ball rolling groove formed on a screw shaft comprising:

a central portion; and a pair of leg portions disposed at both ends of the central portion so as to extend therefrom, the leg portions having inner peripheries having center lines inclined in directions different from each other with respect to a center line of an inner periphery of the central portion, wherein the leg portions have outer peripheries having center lines being parallel to each other and have thicknesses, different in circumferential directions thereof, at cross sections in directions normal to center lines of the outer peripheries of the respective leg portions.

In this aspect, in the case where a pair of leg portions is inclined in directions different from each other with respect to the central portion of the circulation member, a fitting hole formed on the nut member for fitting the circulation member provides a slot shape on a plane. This is not avoided in its structure because a tube having a circular section is inserted, in an oblique attitude, into the nut member. Such slot is worked and formed by horizontally sliding a blade having a circular section, for example. However, in such working method, there is a fear of the blade being inclined because of resistance at the time of horizontally moving. This defect will results in deterioration of working accuracy.

According to the present invention of the described aspect, however, the leg portion is formed so as to have a thickness different in circumferential direction at the section in the direction normal to the center line of the outer periphery of the leg portion. Thus, the leg portion can be formed so as to provide substantially circular outer shape in section, whereby the hole of the nut member can be formed so as to also provide substantially the circular shape in section in conformity with the outer shape of the circulation member. Therefore, the fitting hole can be easily formed on the nut member with high accuracy.

In a preferred embodiment of this aspect, the center lines of the inner peripheries of the paired leg portions are inclined with respect to the center line of the inner periphery of the central portion of the circulation member so as to correspond to a lead angle of the screw shaft.

The leg portions are disposed so that the center lines of the inner peripheries thereof are each positioned in a tangential direction of the spiral ball rolling groove.

In a further aspect of the present invention, there is also provided a ball screw comprising:

a screw shaft on which a spiral ball rolling groove is formed;

a nut member having a spiral loaded rolling groove corresponding to the spiral ball rolling groove formed on the screw shaft;

a number of balls rolling along a passage formed by the spiral ball rolling groove of the screw shaft and the spiral loaded rolling groove; and a circulation member formed for the screw shaft for circulating a ball rolling on the spiral ball rolling groove formed on the screw shaft, the circulation member comprising:

a central portion; and a pair of leg portions disposed at both ends of the central portion so as to extend therefrom, wherein the leg portions have inner peripheries having center lines inclined in directions different from each other with respect to a center line of an inner periphery of the central portion, and the circulation member is divided into two parts by first and second division surfaces, the first division surface lying on a plane including a center line of the inner periphery of one of the leg portions and the center line of the inner periphery of the central portion and the second division surface being different from the first division surface and lying on a plane including a center line of the inner periphery of the other one of the leg portions and the center line of the inner periphery of the central portion.

In a still further aspect of the present invention, there is also provided a ball screw comprising:

a screw shaft to which a spiral ball rolling groove is formed;

a nut member having a spiral loaded rolling groove corresponding to the spiral ball rolling groove formed on the screw shaft;

a number of balls rolling along a passage formed by the spiral ball rolling groove of the screw shaft and the spiral loaded rolling groove; and a circulation member formed for the screw shaft for circulating a ball rolling on the spiral ball rolling groove formed on the screw shaft, the circulation member comprising:

a central portion; and a pair of leg portions disposed at both ends of the central portion so as to extend therefrom, the leg portions having inner peripheries having center lines inclined in directions different from each other with respect to a center line of an inner periphery of the central portion, wherein the leg portions have outer peripheries having center lines being parallel to each other and have thicknesses, different in circumferential directions thereof, at cross sections in directions normal to center lines of the outer peripheries of the respective leg portions.

The nature and further characteristic features of the present invention will be made more clear from the following descriptions made with reference to the accompanying drawings.

BRIEF DESCRIPTION OF THE DRAWINGS

In the accompanying drawings:

FIG. 2, including FIGS. 2A to 2D, shows relationship between a non-loaded return passage formed on an inner peripheral surface of the return pipe and a spiral loaded rolling passage, in which FIG. 2A shows a state of the screw shaft viewed from its axial direction, FIG. 2B is a plan view of the screw shaft from an upper side thereof, FIG. 2C shows a twisted state of a non-loaded return passage and FIG. 2D is a side view from the side portion of the screw shaft;

FIG. 4, including FIGS. 4A to 4D, shows details of an assembled return pipe of FIG. 3, in which FIG. 4A shows a plan view of the return pipe, FIG. 4B is a side view of the return pipe viewed from the axial direction of the screw shaft, FIG. 4C shows a side view of the return pipe viewed from a direction normal to the axial line of the screw shaft, and FIG. 4D is a front view of the return pipe;

FIG. 6, including FIGS. 6A and 6B, shows the detail of the divided two parts of the return pipe at a portion near the divided leg portions, in which FIG. 6A shows a sectional view along the center line of the divided leg portion and FIG. 6B is a perspective view thereof;

FIG. 7, including FIGS. 7A and 7B, shows the return pipe and a mount hole formed on a nut member of the screw shaft, in which FIG. 7A shows a conventional tube-type return pipe and FIG. 7B shows a return pipe according to the present invention;

FIG. 10, including FIGS. 10A and 10B, shows a conventional return pipe in a divided state, in which FIG. 10A shows a divided state thereof and FIG. 10B shows a state mounted to the nut member.

DESCRIPTION OF THE PREFERRED EMBODIMENT

Figure 1:
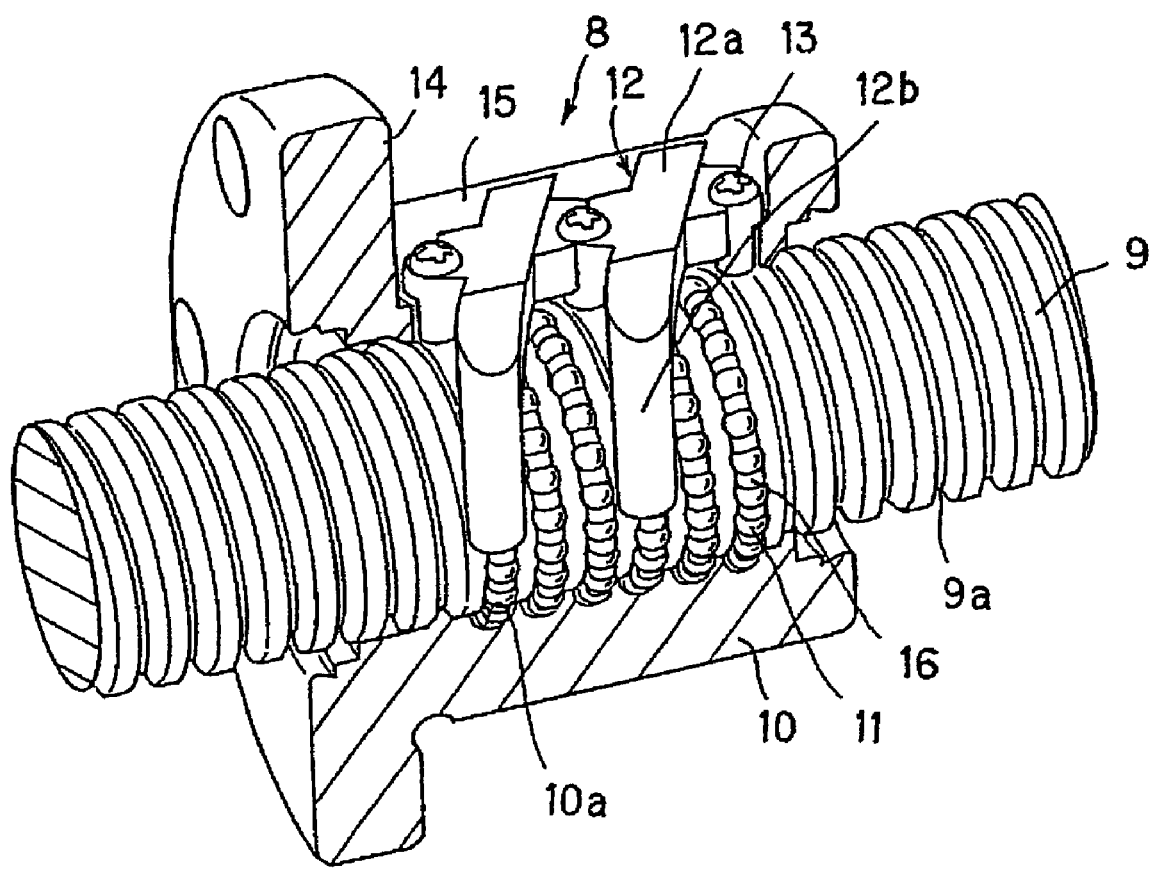
FIG. 1 is a perspective view of a ball screw assembled with a return pipe according to one embodiment of the present invention.
Figure 2A:
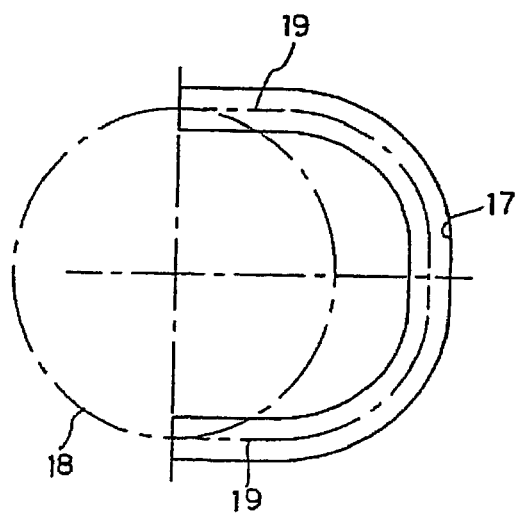
Figure 2B:
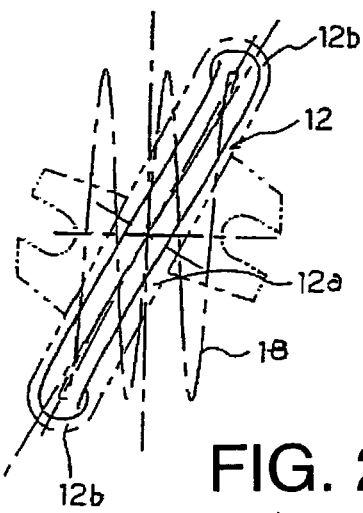
Figure 2C:
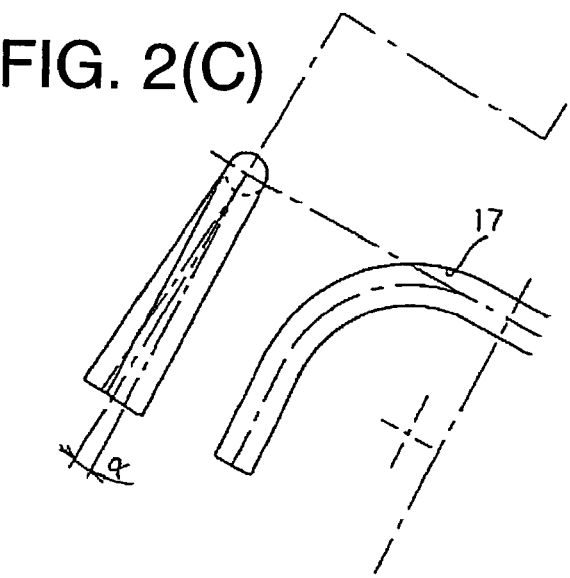
Figure 2D:
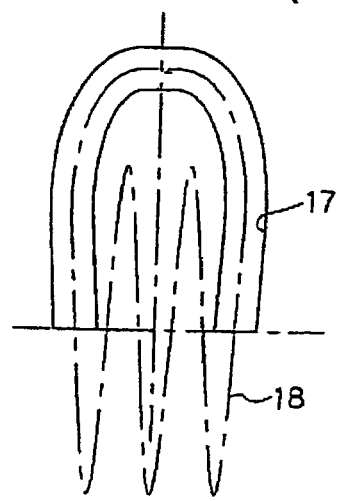

FIG. 1 shows a ball screw to which a circulation member according to one embodiment of the present invention is mounted. With reference to FIG. 1, a ball screw 8 comprises a screw shaft 9 having a spiral ball rolling groove 9a formed on its outer peripheral surface, a nut member 10 having a spiral loaded rolling groove 10a formed on its inner peripheral surface so as to oppose to the ball rolling groove 9a of the screw shaft 9 and a number of balls 11, 11, - - -, 11 rolling in a passage, as loaded rolling passage, formed by the ball rolling groove 9a and the loaded rolling groove 10a.

The nut member 10 is equipped with two, for example, return pipes 12 as circulation members or parts. The return pipe 12 constitutes a non-loaded return passage by connecting one and the other ends of the loaded rolling passage. The return pipe 12 provides approximately a portal shape having a central portion 12a and a pair of leg portions 12b, 12b formed at both ends of the central portion 12a. The paired leg portions 12b, 12b of the return pipe 12 are fitted into the loaded rolling passage at an interval of several pitches. Further, the return pipes 12, 12 are fixed to the nut member 10 by, for example, means of bolts 13.

The screw shaft 9 is formed, on its outer peripheral surface, with the ball rolling groove 9a through grinding or rolling working, so as to provide an approximately semi-circular cross section and a constant spiral lead. The nut member 10 has substantially a cylindrical shape and is provided with a flanged portion 14 at its one end surface for mounting the ball screw to a machine or like. Further, as mentioned before, on the inner peripheral surface of the nut member 10 is formed the loaded rolling groove 10, having approximately semi-circular cross section, so as to oppose to the ball rolling groove 9a of the screw shaft 9. The nut member 10 is also formed with a flat portion 15 by planing a portion of the upper surface of the nut member 10, and a several return pipe fitting holes into which the leg portions 12b, 12b of the return pipes 12 are formed in this flat portion 15.

In a structure of the described embodiment of the present invention, a number of spacers 16, 16, - - -, 16 are interposed between the respective adjacent balls 11, 11 so as to prevent the balls from contacting or colliding each other. The return pipe 12 according to the present invention is of course applicable to a ball screw provided with no such spacer.

FIG. 2 includes views showing the relationship between the non-loaded return passage 17 formed in the inner peripheral surface of the return pipe 12 and the spiral loaded rolling passage 18 formed on the screw shaft 9 of the ball screw. The outer configuration of the return pipe 12 is designated by two-dot chain line, the non-loaded return passage 17 is shown with solid line, and the center line of a track of the ball in the loaded rolling passage 18 is shown with one-dot chain line. FIG. 2A shows a state of the screw shaft 9 viewed from its axial direction, FIG. 2B is a plan view of the screw shaft 9 from the upper side thereof, FIG. 2C shows a twisted state of the non-loaded return passage 17 and FIG. 2D is a side view from the side portion of the screw shaft 9.

With reference to FIG. 2 (FIGS. 2A to 2D), the balls 11 roll on the spiral loaded rolling passage 18. During such motion, at a time when the balls 11 are scooped along the tangential direction of this spiral loaded rolling passage 18, the ball change a direction in its own advancing direction, any compulsory force is not applied. For this reason, center lines 19, 19 of the inner peripheral surfaces of the paired leg portions 12b, 12b of the return pipe 12 are positioned, as shown in FIG. 2A, in the tangential direction of the loaded rolling passage 18 and, as shown in, FIGS. 2B to 2D, are inclined, with an angle a between them, in different directions from each other with the center line of the central portion 12a being the center thereof so as to correspond to the lead angle of the spiral loaded rolling passage 18.

In the described embodiment, considering the smooth circulation of the balls 11, the center line of the leg portion 12b is positioned in the tangential direction and inclined in the direction corresponding to the lead angle of the spiral loaded rolling passage 18. However, it may be possible not to be disposed in the tangential direction of the center line of the leg portion 12b and it is possible to be inclined at an angle smaller than the lead angle to prevent interference with the adjacent screw groove or it may be possible to be inclined at an angle larger than the lead angle.

Figure 3:
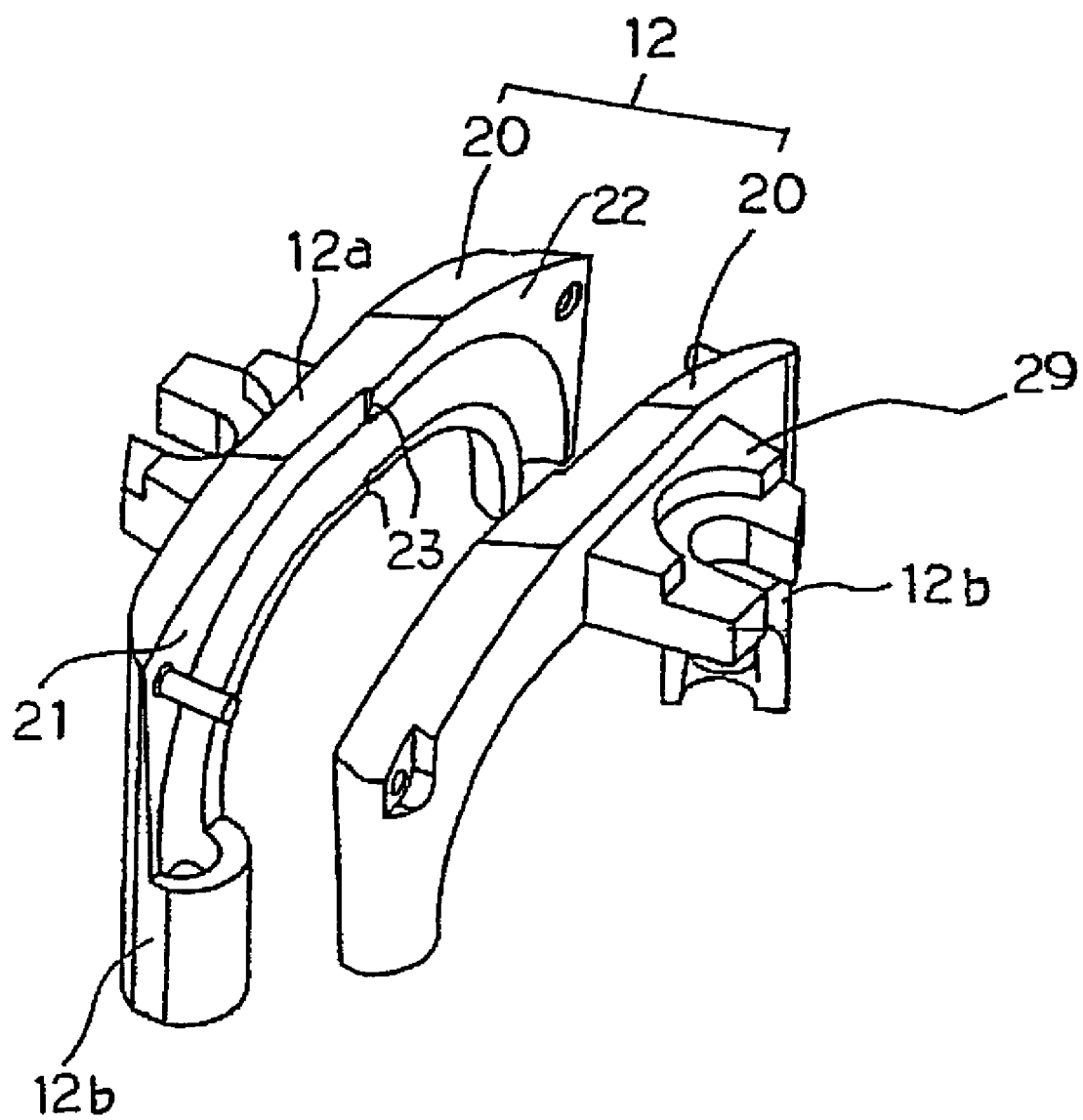
FIG. 3 is a developed perspective view of the return pipe.
Figure 4A:
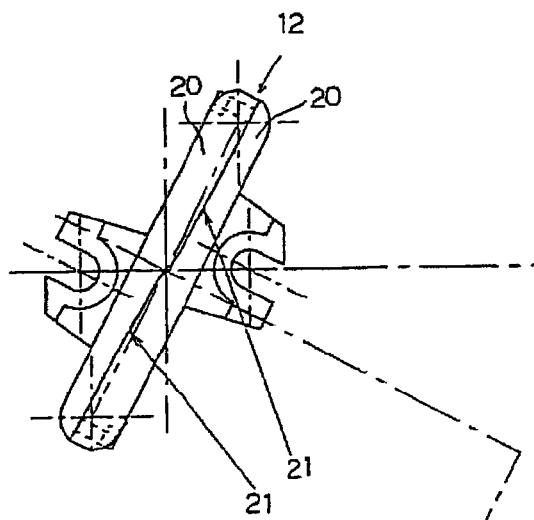
Figure 4B:
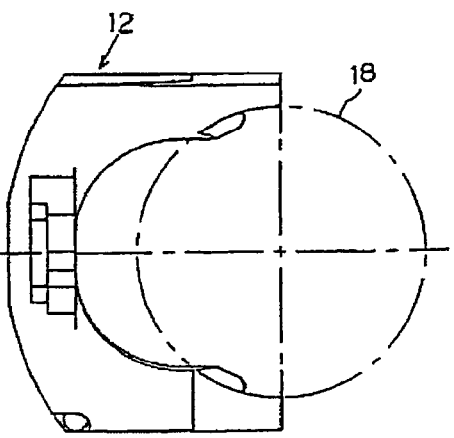
Figure 4C:
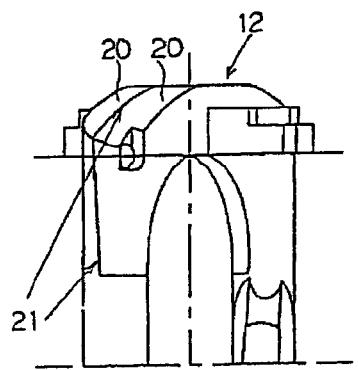
Figure 4D:
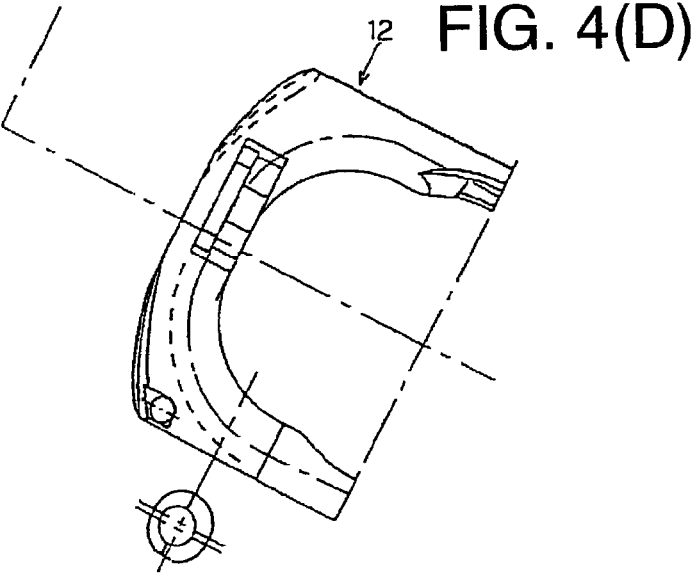

FIG. 3 is the developed perspective view of the return pipe 12 and FIG. 4 shows details of the assembled return pipe 12 of FIG. 3, in which FIG. 4A shows a plan view of the return pipe 12, FIG. 4B is the side view of the return pipe 12 viewed from the axial direction of the screw shaft 9, FIG. 4C shows the side view of the return pipe 12 viewed from a direction normal to the axial line of the screw shaft 9, and FIG. 4D is the front view of the return pipe 12. With reference to FIGS. 3 and 4, the return pipe 12 is divided into two parts approximately along the axial line thereof. In detail, the return pipe 12 is divided by a first division surface 21 including the center line of the inner periphery of one leg portion 12b and the center line of the inner periphery of the central portion 12a and, different from this first division surface 21, a second division surface 22 including the center line of the inner periphery of the other one leg portion 12b and the center line of the inner periphery of the central portion 12a. These first and second division surfaces 21 and 22 are flat surfaces.

When the return pipe 12 is molded in assembled mold halves, it may be necessary to design the return pipe such that the dividing surface lies on the center line of the circular cross section thereof in consideration of the mold-out process. As mentioned before, since the paired leg portions 12b, 12b are inclined in the directions different from each other with respect to the central portion 12a, a staged portion 23 (a portion having difference in level) is formed at a position at which the first and second division surfaces 21 and 22 intersect each other on the joining surfaces of the respective divided parts 20, 20 (which may mean herein parts to be divided 20, 20). The staged portion 23 is formed at substantially the central portion in the axial direction of the return pipe. Accordingly, the laterally paired divided parts 20, 20 provide the quite same shape, and the paired divided parts 20, 20 are combined through, such as, thermal calking, fusing or joining (bonding) process, or by using adhesive sheet or clip as coupling means. Further, the staged portion 23 formed on the joining surface may be formed with an arcuate portion.

In the case where the return pipe 12 is formed by means of mold, it is general to mold a mold product by using mold halves which are openable in front and rear direction. Accordingly, if the joining surfaces of the divided parts 20, 20 of the return pipe 12 have twisted shapes, it is difficult to mold the divided parts 20, 20. On the contrary, according to the embodiment of the present invention, since the return pipe 12 is divided at the first and second division surfaces 21 and 22, the joining surfaces (surfaces to be joined) of the divided parts 20, 20 will never be twisted, thus realizing the improved molding of the divided parts 20, 20.

In the case where the divided parts 20, 20 of the return pipe 12 is formed by means of mold, the return pipe 12 can be formed from resin or metal material, which results in improved performance of the return pipe 12 as well as cost merit. Moreover, it becomes also possible to form the return pipe in different shape so as to be made thick at only a required portion such as direction changing portion without making the even thickness at all the portion of the return pipe, thus being advantageous. Still furthermore, by utilizing the staged portion 23, the respective divided parts 20, 20 can be easily coupled and positioned when assembled.

Since the divided two parts 20, 20 have the same shape, the return pipe 12 can be formed by turning one of them by 180° and assembling it with the other one part, and furthermore, the paired divided parts 20, 20 can be manufactured by using one set of mold halves, which also result in the decreasing of the initial manufacturing cost.

In the described embodiment, the return pipe 12 is formed from a resin product. As mentioned before, the resin pipe 12 may be formed of resin or metal material by using a mold. In the case of the metal product, it is molded by thermally treating metal powder, and the metal product will provide a strength substantially identical to that of a conventional metal tube. However, in the case where the return pipe 12 is formed of the metal material, as the return pipe 12 and the ball 11 will achieve the metal-to-metal contact, wearing will be caused and, hence, chip or like may be generated. In the loaded rolling passage 18, the balls 11, 11, - - - carry out the rolling motion between the screw shaft 9 and the nut member 10, so that less wearing is caused and, hence, less chip, dust or like is generated. On the other hand, in the return pipe 12, the balls 11, 11, - - - slide and somewhat roll, and accordingly, when the balls 11 are circulated at high speed, large load is applied to the direction changing passage of the return pipe 12 and, hence, wearing, or chip or dust will be caused, thus being defective. Such defect can be suppressed by forming the return pipe 12 from the resin product.

Figure 5:
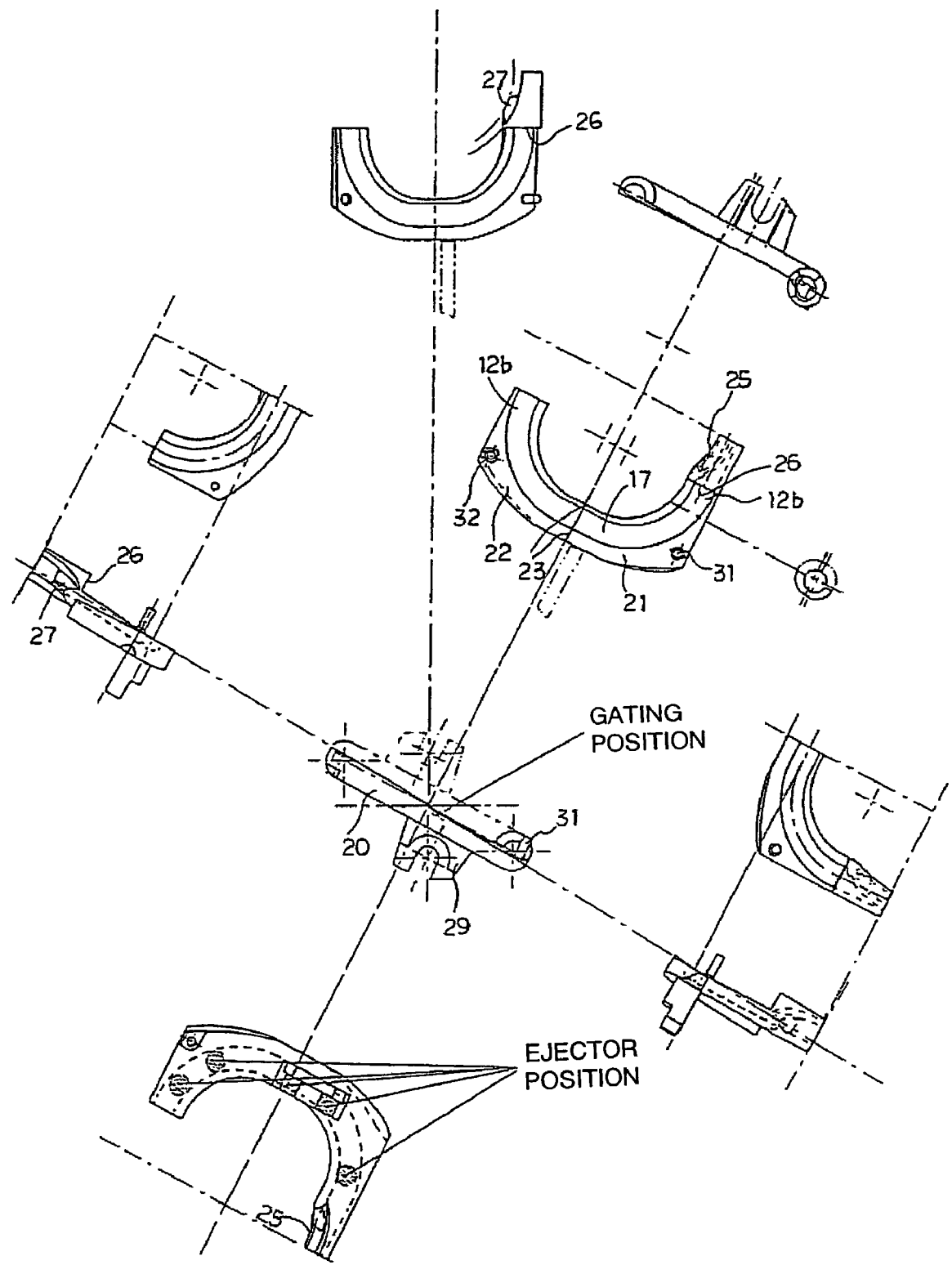
FIG. 5 shows a developed view of the divided one part of the return pipe viewed from various directions.

With reference to FIG. 5 showing one of the divided parts 20, 20 of the return pipe 12, the divided part 20 has the first division surface 21 and the second division surface 22, and the staged portion 23 is formed at the central portion in the axial direction thereof. This staged portion 23 is formed on each side of the non-loaded return passage 17. Scooping portions 25, 25 are molded to the front (free) end portions of the paired leg portions 12b, 12b, respectively, so as to contact and scoop the balls 11 rolling around the screw shaft 9 into the return pipe 12. These scooping portions 25, 25 are integrally formed on the respective divided parts 20, 20 but are not divided by the first or second division surface 21 or 22. That is, the first and second division surfaces 21 and 22 brake off on the way of the leg portions 12b, 12b respectively, and intersect leg portion division surfaces 26, 26 normal to the center lines of the inner peripheries of the leg portions 12b, 12b. The scooping portion 25 is thus formed in one of the divided leg portion 12b. The leg portion 12b in which the scooping portion 25 is not formed is cut off by the same plane as that of the leg portion division surface 26. As shown in FIGS. 3 and 4, by assembling the two divided parts 20, 20, the scooping portions 25, 25 are formed in the paired leg portions 12b, 12b of the return pipe 12, respectively.

FIG. 6 shows the detail of the divided two parts 20, 20 of the return pipe 12 at a portion near the leg portion division surface 26 (i.e., joining surface), in which FIG. 6A shows the sectional view along the center line of the leg portion 12*b* of the divided part 20 and FIG. 6B is a perspective view thereof. On the leg portion division surface 26 of the divided part 20 by which the scooping portion 25 is not divided, a difference in level (staged portion) is caused due to such as dimensional error at the molding process or an error at the assembling process, and there may cause a fear of engaging the balls with such staged portion. For this reason, in order not to cause such difference in level, chamfering may be effected to one or both of the joining surfaces 33, 33 of the two divided parts 20, 20.

The scooping portion 25 contacts the ball 11 to scoop the ball 11 from the loaded rolling passage 18 into the return pipe 12. For this purpose, it is required for the scooping portion 25 to have a certain strength. Moreover, in order to smoothly scoop the ball 11, it is also required for the scooping portion 25 to have a high precision in dimension. In such requirement, if the scooping portion 12*b* is formed in a divided manner to the divided two leg portions 12*b*, there is a fear of causing a force to the scooping portion 25 to be opened by the contact of the ball 11 to the divided scooping portion 25, and moreover, the scooping portion 25 may itself provide the difference in level at the divided portions. According to the described embodiment, the scooping portion 25 is integrally formed in each of the divided parts 20, 20 and is not itself divided, so that the scooping portion 25 thus formed can provide high strength and high dimensional precision. Moreover, such scooping portion 25 may be utilized as a positioning member at the time of assembling the respective divided parts 20, 20 into the return pipe 12.

The scooping portion 25 of the described embodiment has a shape such that a cut end (section) provides a width gradually narrowed towards the inward of the return pipe 12, and the ball 11 can be scooped through the contact of both side portions of this cut end portion to the ball 11. In addition, in this embodiment, as shown in FIG. 5, the scooping portion 25 is formed, at its root portion, with a tongue shaped projection 27, which acts to guide the spacer 16 disposed between adjacent two balls 11, 11. As mentioned above, since the scooping portion 25 has a complicated shape or configuration, it is difficult to machine work the scooping portion 25. And, it is difficult to form the scooping portion 25 by using only a laterally divided mold halves. For this reason, in this embodiment, the scooping portion 25 is molded by using a slide mold, not shown, enabling scooping portion 25 to slide in the axial direction of the leg portion 12*b*. More especially, the slide mold is inserted into a lateral pair of molds at the time of molding process, and next, under the inserted state, the scooping portion 25 is formed in the divided part 20. When the mold halves are separated, the slide mold is slid in the opposing direction to thereby take out the divided part 20. By using the slide mold, not only the complicated scooping portion, but also the inner periphery of the leg portion can be molded or formed.

Further, in the described embodiment, although the scooping portion 25 is not formed with any lip portion for scooping the ball 11 in contact thereto, it is of course possible to form a certain projection or like portion, such as lip, contacting and scooping the ball.

Each of the divided parts 20, 20 of the return pipe 12 is integrally formed with a mount seat 29 (FIG. 5). In a tubular return pipe of conventional structure formed through a bending working or like working, it is necessary to separately dispose a pressing part for pressing the return pipe to the nut member. In such return pipe, however, even if the return pipe is pressed, there was caused a case that the return pipe might be rotated and when the return pipe is pressed with more large force to prevent such rotation, there was also caused a case that the return pipe might be crushed. According to the present invention, in this regard, since the mount seat 29 for mounting the return pipe 12 to the nut member 10 is integrally formed with each divided part 20, parts or members to be required for the ball screw can be significantly reduced, thus being advantageous especially in cost. The rotation of the return pipe 12 can be also prevented. Furthermore, the return pipe 12 will be mounted to the nut member 10 with easily adjustable mount angle, and the scooping portion 25 can be hence suitably positioned in operation.

With also reference to FIG. 5, a positioning pin 31 is integrally formed on the first division surface 21 of each of the divided parts 20 of the return pipe 12 for mutually positioning the paired divided parts 20, 20, and on the other hand, a hole 32 to be fitted with the positioning pin 31 is formed on the second division surface 22 of each divided part 20. The positioning pin 31 and the fitting hole 32 serve to position the divided parts 20, 20 in association with the staged portion 23 and the scooping portion 25 as mentioned above.

Figure 7B:
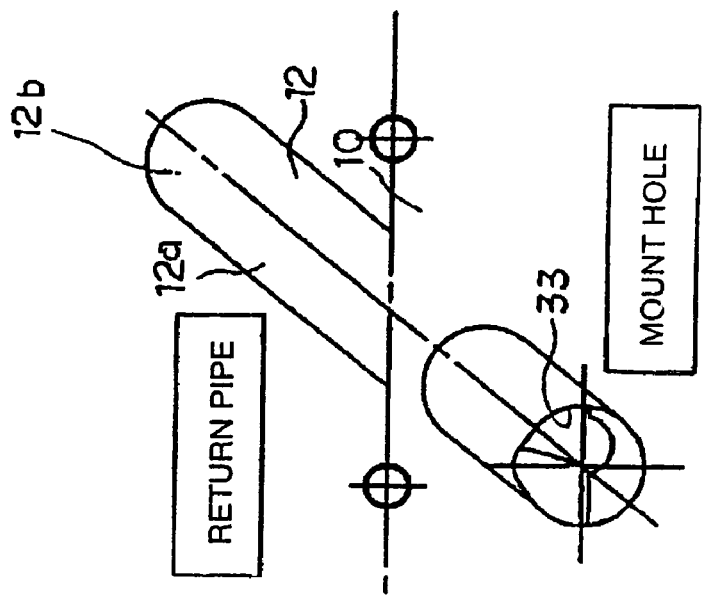
Figure 7A:
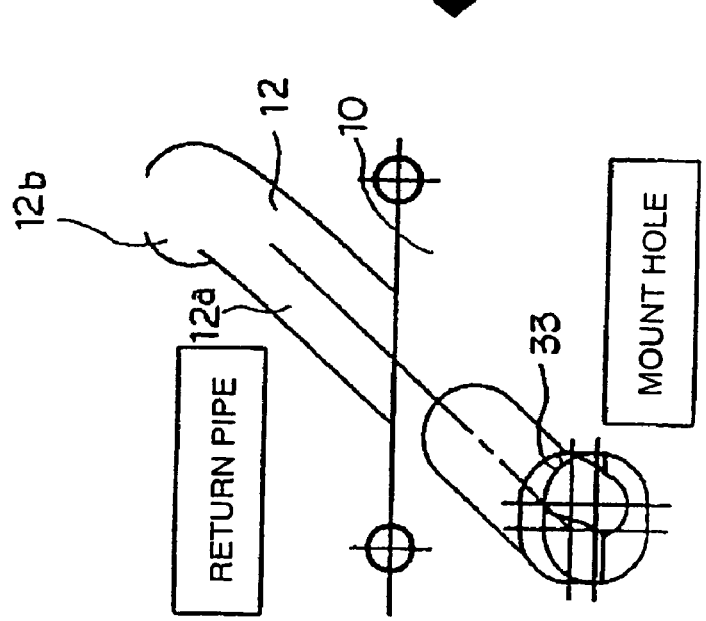

FIG. 7 shows the return pipe 12 as the circulation member and a mount (mounting) hole 33 formed in the nut member 10, in which FIG. 7A shows a conventional tube-type return pipe and FIG. 7B shows the return pipe 12 according to the present invention. With reference to FIG. 7A, the leg portion 12*b* of the return pipe 12 is inclined with respect to the central portion 12*a* thereof, and the leg portion 12*b* has the even thickness in its section. In such structure, the mount hole 33 for mounting the return pipe to the nut member 10 provides a slot shape on a plane. Such fact is not avoidable in its structure because the tube having a circular section is inserted into the nut member 10 in an oblique state. This mount hole 33 in slot shape is, for example, formed by horizontally sliding a blade having a circular section. However, in such hole forming method, there is a fear of being inclined by a resisting force to the blade at the time of horizontally moving the blade, which results in deterioration in working accuracy. In addition, there is also a fear that a gap may be formed between the mount hole 33 and the return pipe 12 and any foreign substance may be invaded into such gap.

On the other hand, as shown in FIG. 7B, in the described embodiment, the inner periphery of the leg portion 12*b* of the return pipe 12 is inclined with respect to the inner periphery of the central portion 12*a* thereof, but the outer periphery of the leg portion 12*b* is not inclined with respect to the outer periphery of the central portion 12*a*. That is, the center lines of the paired leg portions 12*b*, 12*b* of the return pipe 12 are parallel to each other and the thickness of the leg portion 12*b* differs in its circumferential direction at a cross section in the direction normal to the center line of the outer periphery of the leg portion 12*b*. Thus, the outer peripheries of the paired leg portions 12*b*, 12*b* have each substantially circular cross section. According to the described embodiment, the thickness of the leg portion 12*b* differs in the circumferential direction on the cross section in the direction normal to the center line of the outer periphery of the leg portion 12*b*, irrespective of the inner peripheral shape of the leg portion 12*b*, the outer periphery of the leg portion 12*b* can be made to provide, for example, substantially circular section, whereby the mount hole 33 formed in the nut member 10 can accord with the outer shape of the return pipe 12, for example, so as to provide substantially circular section. Thus, the mount hole 33 can be easily formed in the nut member 10 with high precision.

Figure 8:
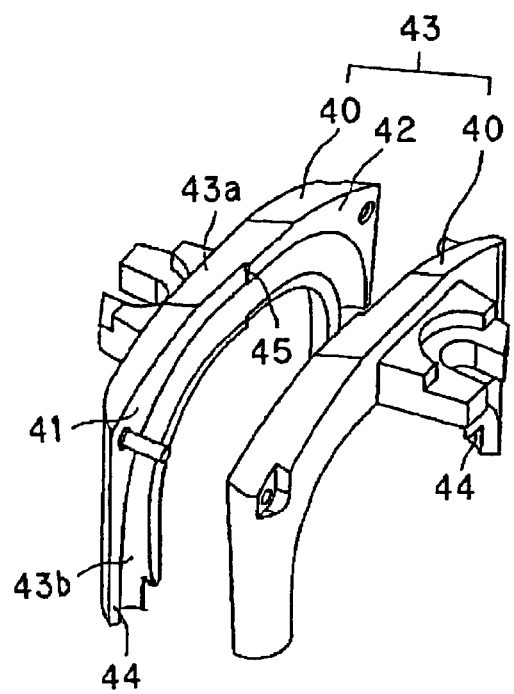
FIG. 8 is a perspective view showing another example of a circulation member of a ball screw of the present invention.
Figure 9:
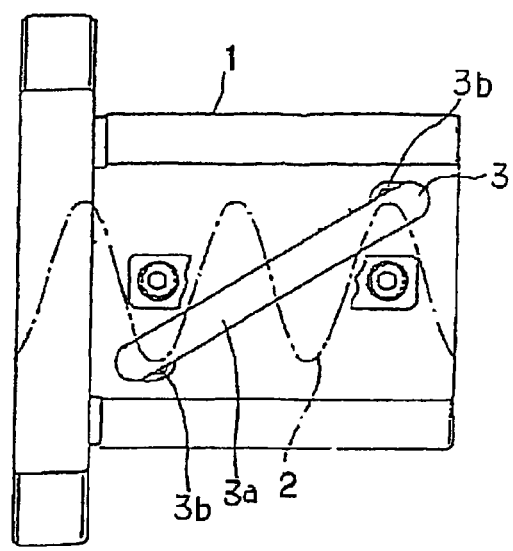
FIG. 9 is a plan view showing a conventional ball screw.
Figure 10B:
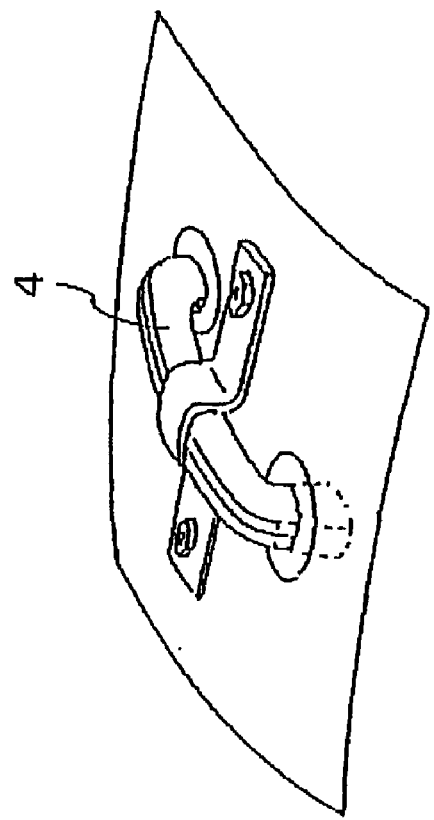
Figure 10A:
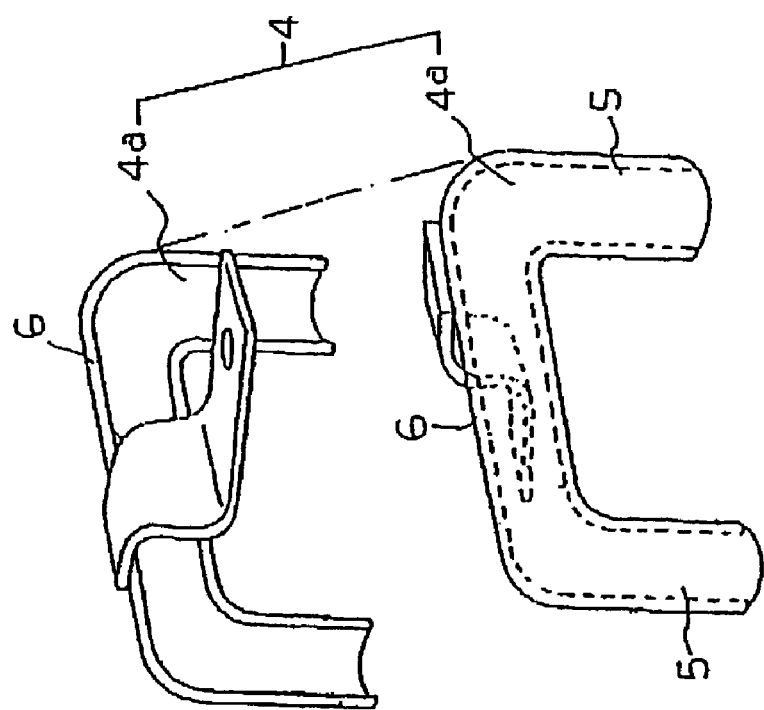

FIG. 8 represents another example of a circulation member for the ball screw. With reference to this example, a circulation member 43 as return pipe comprises a pair of divided parts 40, 40 which are divided only by first and second division surfaces 41 and 42. A portion having difference in level as a staged portion 45 is formed at a central portion 43a of the circulation member 43 by the first and second division surfaces 41 and 42. In this example, a scooping portion 44 formed in the front end of each of the paired leg portions 43b, 43b is also divided into two parts by the first and second division surfaces 41 and 42. That is, the scooping portions 44 are formed in a pair of leg portions 43b, 43b of the respective divided parts 40, 40 so as to provide each substantially semi-circular section, and the scooping portion 44 is itself formed by joining, i.e., assembling, the two divided parts 40, 40 for forming the circulation member 43 as the return pipe.

Further, it is to be noted that the present invention is not limited to the described embodiments and many other changes and modifications may be made without departing from the scopes of the appended claims.

For example, a third division surface different from the first division surface, the second division surface and the leg portion division surface may be additionally formed on the joining surfaces of the respective divided parts of the return pipe. The staged portion different in level may be formed at a portion other than the central portion of the return pipe. In addition, the return pipe may be formed as a metal product as well as resin product. Furthermore, the ball screw of the described invention may be applied as a ball screw assembled to a driving unit.

The present application claims priority under 35 U.S.C § 119 to Japanese Patent Application No. 2001-372047 filed Dec. 5, 2001 entitled "RETURN PIPE OF BALL SCREW AND BALL SCREW USING SAME", and Japanese Patent Application No. 2002-324425 filed Nov. 7, 2002 entitled "CIRCULATION MEMBER OF BALL SCREW AND BALL SCREW USING SAME". The contents of that application are incorporated herein by reference in their entirety.

What is claimed is:

1. A circulation member of a ball screw for circulating a ball rolling on a spiral ball rolling groove formed on a screw shaft comprising:
   a central portion; and
   a pair of leg portions disposed at both ends of the central portion so as to extend therefrom,
   wherein said leg portions have inner peripheries having center lines inclined in directions different from each other with respect to a center line of an inner periphery of the central portion and said circulation member is divided into two parts by first and second division surfaces, said first division surface lying on a plane including a center line of the inner periphery of one of the leg portions and the center line of the inner periphery of the central portion and said second division surface being different from said first division surface and lying on a plane including a center line of the inner periphery of the other one of the leg portions and the center line of the inner periphery of the central portion, wherein the divided two parts have joining surfaces on which a staged portion having difference in level is formed by the first and second division surfaces.

2. The circulation member of a ball screw according to claim 1, wherein the center lines of the inner peripheries of the paired leg portions are inclined with respect to the center line of the inner periphery of the central portion of the circulation member so as to correspond to a lead angle of the screw shaft.

3. The circulation member of a ball screw according to claim 1 or 2, wherein said leg portions are disposed so that the center lines of the inner peripheries thereof are each positioned in a tangential direction of the spiral ball rolling groove.

4. The circulation member of a ball screw according to claim 1 or 2, wherein said divided parts are molded products of resin.

5. The circulation member of a ball screw according to claim 1 or 2, wherein a free end portions of the paired leg portions are formed with scooping portions respectively which scope balls rolling on a periphery of the screw shaft by contacting the balls, the scooping portions are molded integrally with the divided parts respectively, and each of the scooping portions is not divided by either one of the first and second division surfaces.

6. The circulation member of a ball screw according to claim 1 or 2, wherein said circulation member is divided into two parts only by the first and second division surfaces.

7. The circulation member of a ball screw according to claim 1 or 2, wherein each of said divided parts is formed integrally with a mount seat for mounting the circulation member to a nut member of the ball screw.

8. A circulation member of a ball screw for circulating a ball rolling on a spiral ball rolling groove formed on a screw shaft comprising:
   a central portion; and
   a pair of leg portions disposed at both ends of the central portion so as to extend therefrom, said leg portions having inner peripheries having center lines inclined in directions different from each other with respect to a center line of an inner periphery of said central portion,
   wherein said leg portions have outer peripheries having center lines being parallel to each other and have thicknesses, different in circumferential directions thereof, at cross sections in directions normal to center lines of the outer peripheries of the respective leg portions.

9. The circulation member of a ball screw according to claim 8, wherein the center lines of the inner peripheries of the paired leg portions are inclined with respect to the center line of the inner periphery of the central portion of the circulation member so as to correspond to a lead angle of the screw shaft.

10. The circulation member of a ball screw according to claim 8 or 9, wherein said leg portions are disposed so that the center lines of the inner peripheries thereof are each positioned in a tangential direction of the spiral ball rolling groove.

11. A ball screw comprising:
   a screw shaft on which a spiral ball rolling groove is formed;
   a nut member having a spiral loaded rolling groove corresponding to the spiral ball rolling groove formed on the screw shaft;
   a number of balls rolling along a passage formed by the spiral ball rolling groove of the screw shaft and the spiral loaded rolling groove; and
   a circulation member formed for the screw shaft for circulating a ball rolling on the spiral ball rolling groove formed on the screw shaft, said circulation member comprising:
  a central portion; and
  a pair of leg portions disposed at both ends of the central portion so as to extend therefrom,
    wherein said leg portions have inner peripheries having center lines inclined in directions different from each other with respect to a center line of an inner periphery of the central portion, and said circulation member is divided into two parts by first and second division surfaces, said first division surface lying on a plane including a center line of the inner periphery of one of the leg portions and the center line of the inner periphery of the central portion and said second division surface being different from said first division surface and lying on a plane including a center line of the inner periphery of the other one of the leg portions and the center line of the inner periphery of the central portion,
    wherein the divided two parts have joining surfaces on which a staged portion having difference in level is formed by the first and second division surfaces.

12. A ball screw comprising:
a screw shaft to which a spiral ball rolling groove is formed;
a nut member having a spiral loaded rolling groove corresponding to the spiral ball rolling groove formed on the screw shaft;
a number of balls rolling along a passage formed by the spiral ball rolling groove of the screw shaft and the spiral loaded rolling groove; and
a circulation member formed for the screw shaft for circulating a ball rolling on the spiral ball rolling groove formed on the screw shaft,
said circulation member comprising:
  a central portion; and
  a pair of leg portions disposed at both ends of the central portion so as to extend therefrom, said leg portions having inner peripheries having center lines inclined in directions different from each other with respect to a center line of an inner periphery of the central portion,
    wherein said leg portions have outer peripheries having center lines being parallel to each other and have thicknesses, different in circumferential directions thereof, at cross sections in directions normal to center lines of the outer peripheries of the respective leg portions.

* * * * *